United States Patent Office 3,059,379
Patented Oct. 23, 1962

3,059,379
FERTILIZER CAPSULE
Osborne J. Attoe, Madison, Wis., assignor to Wisconsin Alumni Research Foundation, Madison, Wis., a corporation of Wisconsin
No Drawing. Filed Dec. 21, 1959, Ser. No. 860,641
2 Claims. (Cl. 47—48.5)

The present invention relates to the fertilizer field and more specifically to means for the controlled release of fertilizer constituents at a rate approximating the current needs of the plant.

It is well known that water-soluble fertilizer nutrients applied, for example, to blue grass, give an abundant first crop (frequently an overabundant first crop as the fertilizer provides more nutrient initially than is required for desired growth), followed by progressively poorer and poorer second, third, etc. crops. The primary reason for this is that the fertilizer is used up rapidly with a large amount, under certain conditions, being lost by leaching during rains, watering, etc. It is also well known that the water-insoluble slow-acting type fertilizers, e.g. a urea-formaldehyde reaction product, although relatively expensive, seldom provides for desired growth initially or for sustained growth over a normal growing season. The primary reason for this is that the fertilizer is not released in accordance with plant needs. Also, considerable amounts of essential nutrients (nitrogen and phosphorus) are fixed in forms unavailable to the plant. As a result of the above, repeated fertilization is ordinarily called for to obtain prolonged growth and economical fertilizer use of the type desired.

The art has long appreciated the problems noted above and the desirability of controlled release of fertilizers. See, for example, Ellis Patent No. 847,749 dated 1907. Various types of fertilizer coatings, porous films and the like have been suggested for use in this field but have proven impractical usually either because they release the fertilizer too rapidly or too slowly, or release all of the fertilizer at one time or fail to release the fertilizer at all. Wax coatings, for example, give poor recovery or tend to burst as small amounts of moisture penetrate the coating and start to dissolve the fertilizer, apparently due to the pressure created in this process. Wax coatings are also objectionable due to the difficulty encountered in preventing agglomeration, i.e. in keeping the coated fertilizer granules separated from each other during the hardening of the wax. While this can be avoided by use of certain types of porous films, the porosity of such films is notoriously non-uniform, making controlled release, as such, substantially impossible.

In extensive investigations in this field, I have discovered that controlled release of the fertilizer at a rate approximating the current needs of the plant can be readily accomplished by enclosing or encapsulating water-soluble fertilizer ingredients in a small receptacle or capsule made up of a thin film such as polyethylene film or the like provided with 1 to about 8 or more apertures or holes having diameters preferably within the approximate range of about 0.05–2.0 mm. The film used to form the capsule should be substantially impermeable for uniform release as pointed out above in connection with the use of porous films, and should also be substantially indestructible in the soil, i.e. resistant to soil organisms, various weather conditions, etc., at least during the growing period. Thin relatively inexpensive films of the conventional commercially available high pressure polyethylene, or the equivalent, with a thickness of about 0.0005 to 0.002 inch have proven satisfactory and are illustrative of the type preferred.

The fertilizer nutrients used in the present invention can be made up of conventional water-soluble chemical compounds providing available nitrogen, phosphorus and potassium. Illustrative examples include mono-ammonium phosphate, ammonium nitrate, potassium chloride, potassium phosphate, mono-calcium phosphate, urea, etc. Salts which are readily or very soluble in water as well as salts which are relatively less soluble in water can be used, but it is preferred, when using various combinations, to use salts with similar solubilities. The ratios of nitrogen (N), phosphate ($P_2O_5$) and potassium ($K_2O$) in the fertilizer can be of the conventional formulations such as the 12—12—12, 16—8—8, etc. The fertilizer used can also be in powder, granule or pellet form, with each capsule containing about 0.5 to about 5 grams or more (preferably 0.5 to 2.0 grams for Kentucky blue grass) of nutrient salts or equivalent fertilizer nutrient material. Growth promoting substances such as gibberellic acid, trace elements, etc. can also be incorporated in the fertilizer mixture.

Investigations have demonstrated that the rate of release of the fertilizer constituents is determined largely by:

(1) Number and size of the apertures or pin holes per capsule.
(2) Weight of the fertilizer per capsule.
(3) Solubility of the fertilizer constituents.
(4) Amount of soil moisture.

The first three can be controlled as noted above. The fourth is not easily controlled, but it automatically works in favor of proper control since both plant growth and release of fertilizer are restricted when soil moisture is low and promoted when it is plentiful. Porosity of the film per se can also play a part in release of the fertilizer, but this is negligible in the present invention as the films used to form the capsules of fertilizer are, as noted above, substantially impermeable.

The following example will serve to illustrate the invention.

EXAMPLE

Polyethylene film about 0.0005 inch thick is first cut into square sheets about 3 by 3 inches. About 1–2 grams of a mixture of mono-ammonium phosphate, ammonium nitrate and potassium chloride in a N, $P_2O_5$ and $K_2O$ ratio of about 16—8—8 is next placed on each sheet of polyethylene.

The fertilizer is then wrapped by taking the four corners of the sheet in one hand and after lifting from the table, twisting the center containing the fertilizer with the other hand to form a small receptacle or capsule. The neck of the capsule is then pressed against a hot iron which seals the capsule and also removes excess film. Two apertures or pin holes with diameters of about $\frac{1}{32}$ inch (about 0.8 mm.) spaced on opposite sides of the capsule, are then made in the film with a standard type pin to provide for entry of soil moisture and release of the fertilizer. One to about eight or even more apertures can be made in the film as indicated above with about 2–4 apertures of the type obtainable by use of a common household pin being generally adequate and preferred. Mixtures of capsules containing different numbers of apertures such as a mixture containing about equal numbers of capsules containing 1, 2, 4, 6 and 8 apertures can be used to advantage where desired. Where the capsule contains several apertures they should be spaced apart and preferably equal distances apart around the capsule. The apertures can also be made in the film prior to the formation of a capsule instead of after the formation of the capsule. The packaging and perforation can be mechanized for commercial production as, for example, by formation of the capsules by extruding the polyethylene, by spraying on a pressed granule, etc.

Field tests using 500–2000 lbs. of fertilizer per acre for Kentucky blue grass have demonstrated that the capsules of the present invention provide for fertilizer efficiency by controlled release of the fertilizer and by doing so spread desired growth out over the summer months or growing season. Small increases in yield (about ¼ ton per acre) were also obtained by encapsulating the fertilizers. The following table of results on the yield of four successive cuttings of Kentucky blue grass, on a farm at Madison, Wisconsin, is illustrative:

Table

| Fertilizer 16-8-8, Lbs./Acre | | Yield of Dry Matter-Tons/Acre | | | | |
|---|---|---|---|---|---|---|
| | | 1st Cutting | 2nd Cutting | 3rd Cutting | 4th Cutting | Total |
| 0 | | .339 | .259 | .151 | .876 | 1.625 |
| 1,000 | Fertilizer not encapsulated. | 1.121 | .682 | .248 | .733 | 2.784 |
| 1,000 | Fertilizer encapsulated, two grams per capsule with 2 apertures per capsule. | .600 | .872 | .676 | .977 | 3.125 |

Field tests were also made with encapsulated fertilizer for corn. These tests demonstrated that the application of 1000 pounds per acre of 12—12—12 fertilizer in one-gram capsules containing 4 apertures or pin holes each gave yields up to 131 bushels per acre compared to 114 bushels for the same rate of application of unencapsulated fertilizer. These and other tests have demonstrated that the soil moisture enters the capsule, dissolves a little of the fertilizer which is then released from the capsule and made available to the plant, when the plant due to moisture can use the fertilizer, and that after three months of a normal growing season 10–20% of the fertilizer, in capsules originally containing 1 gram, still remains in the capsules ready for further fertilization. This is of special advantage in the case of perennials. While the capsules of the present invention can be used to advantage for top dressing in fertilizing lawn grass, pastures, crops such as corn, etc., they can also be used to advantage for fertilizing trees including decorative shade trees, fruit trees and for establishing a forest on poor land where repeated fertilizations are both difficult and expensive.

The capsules of the present invention, in addition to use in the fertilizer field for the controlled release of fertilizer, can also be used in the treatment of soils in various like ways. Examples include the controlled release of growth regulating agents, herbicides, insecticides, etc.

It is claimed:
1. As a new article of manufacture, for the controlled release of fertilizer at a rate approximating the current needs of a plant, a fertilizer capsule consisting essentially of water soluble fertilizer salts encapsuled in a thin substantially impermeable film of polyethylene having 1 to about 8 apertures with diameters within the approximate range of about 0.05 to 2.0 mm.
2. A fertilizer capsule, in accordance with claim 1, which contains about 0.5 to 5.0 grams of fertilizer and which contains about 2 to 4 apertures in the polyethylene film having diameters of about 0.8 mm.

References Cited in the file of this patent

UNITED STATES PATENTS

| 1,971,390 | Van Yahres | Aug. 28, 1934 |
| 2,197,594 | Rowell | Apr. 16, 1940 |
| 2,380,721 | Brigden | July 31, 1945 |
| 2,536,196 | McLeod | Jan. 2, 1951 |
| 2,739,422 | Perkins | Mar. 27, 1956 |
| 2,902,795 | Heigl | Sept. 8, 1959 |

FOREIGN PATENTS

| 74,703 | Austria | Sept. 25, 1918 |
| 73,337 | Germany | Jan. 27, 1894 |
| 703,595 | Great Britain | Feb. 3, 1954 |
| 705,926 | Great Britain | Mar. 24, 1954 |

OTHER REFERENCES

Hackh's Chemical Dictionary, third edition, published by Blakiston (Phila.) 1944. Page 617 relied on.

"Textbook of General Botany" (Holman), second edition, published by John Wiley and Sons (N.Y.) 1928. Page 170 relied on.

"Dictionary of Photography" (Sowerby), eighteenth edition, published by Philosophical Library (N.Y.) 1956. Pages 458 and 459 relied on.